US011263011B2

(12) United States Patent
Cassidy et al.

(10) Patent No.: US 11,263,011 B2
(45) Date of Patent: Mar. 1, 2022

(54) COMPOUND INSTRUCTION SET ARCHITECTURE FOR A NEURAL INFERENCE CHIP

(71) Applicant: INTERNATIONAL BUSINESS MACHINES CORPORATION, Armonk, NY (US)

(72) Inventors: Andrew S. Cassidy, San Jose, CA (US); Rathinakumar Appuswamy, San Jose, CA (US); John V. Arthur, Mountain View, CA (US); Pallab Datta, San Jose, CA (US); Michael V. Debole, Poughkeepsie, NY (US); Steven K. Esser, San Jose, CA (US); Myron D. Flickner, San Jose, CA (US); Dharmendra S. Modha, San Jose, CA (US); Hartmut Penner, San Jose, CA (US); Jun Sawada, Austin, TX (US); Brian Taba, Cupertino, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 101 days.

(21) Appl. No.: 16/202,871

(22) Filed: Nov. 28, 2018

(65) Prior Publication Data

US 2020/0167158 A1  May 28, 2020

(51) Int. Cl.
  *G06F 9/30* (2018.01)
  *G06N 3/02* (2006.01)
  *G06F 9/32* (2018.01)
(52) U.S. Cl.
  CPC ........ *G06F 9/3013* (2013.01); *G06F 9/30065* (2013.01); *G06F 9/324* (2013.01); *G06N 3/02* (2013.01)

(58) Field of Classification Search
  None
  See application file for complete search history.

(56) References Cited

U.S. PATENT DOCUMENTS 9,710,265 B1    7/2017  Temam et al.
2008/0155236 A1* 6/2008  Wilson .................... G06F 9/325
                                                      712/241

(Continued)

FOREIGN PATENT DOCUMENTS

WO        9319431 A1      9/1993

OTHER PUBLICATIONS

Cheng et al., "Recent advances in efficient computation of deep convolutional neural networks," Front Inform Tech El, 19(1):64-77 (2018).

*Primary Examiner* — John M Lindlof
(74) *Attorney, Agent, or Firm* — Erik A. Huestis; Stephen J. Kenny; Foley Hoag, LLP

(57) ABSTRACT

A device for controlling neural inference processor cores is provided, including a compound instruction set architecture. The device comprises an instruction memory, which comprises a plurality of instructions for controlling a neural inference processor core. Each of the plurality of instructions comprises a control operation. The device further comprises a program counter. The device further comprises at least one loop counter register. The device is adapted to execute the plurality of instructions. Executing the plurality of instructions comprises: reading an instruction from the instruction memory based on a value of the program counter; updating the at least one loop counter register according to the control operation of the instruction; and updating the program counter according to the control operation of the instruction and a value of the at least one loop counter register.

20 Claims, 8 Drawing Sheets

(56) References Cited

U.S. PATENT DOCUMENTS

| | | | |
|---|---|---|---|
| 2009/0172351 A1* | 7/2009 | Vorbach | G06F 15/7867 |
| | | | 712/15 |
| 2017/0103320 A1 | 4/2017 | Henry et al. | |
| 2017/0132515 A1 | 5/2017 | Yokoi et al. | |
| 2018/0121786 A1 | 5/2018 | Narayanaswami et al. | |
| 2018/0189639 A1 | 7/2018 | Henry et al. | |
| 2018/0341479 A1* | 11/2018 | Temam | G06F 9/345 |

\* cited by examiner

|     | PC  | Cntr1 | Cntr2 |
|-----|-----|-------|-------|
| I0: | 0+1 | 0     | 0     |
| I1: | 1+0 | 0     | 0     |
| I1: | 1+0 | 1     | 0     |
| I1: | 1+0 | 2     | 0     |
| I1: | 1+1 | 3     | 0     |
| I2: | 2-2 | 0     | 0     |
| I0: | 0+1 | 0     | 1     |
| I1: | 1+0 | 0     | 1     |
| I1: | 1+0 | 1     | 1     |
| I1: | 1+0 | 2     | 1     |
| I1: | 1+1 | 3     | 1     |
| I2: | 2+1 | 0     | 1     |
| END |     |       |       |

FIG. 5

|     | F_Addr | D_Addr |
| --- | --- | --- |
| I0: | 0 | 32 |
| I1: | 8 | 100 |
| I1: | 9 | 116 |
| I1: | 10 | 132 |
| I1: | 11 | 148 |
| I2: | 16 | 148 |
| I0: | 16 | 20 |
| I1: | 24 | 100 |
| I1: | 25 | 116 |
| I1: | 26 | 132 |
| I1: | 27 | 148 |
| I2: | 75 | 148 |
| END |   |   |

FIG. 6

COMPOUND INSTRUCTION SET ARCHITECTURE FOR A NEURAL INFERENCE CHIP

This invention was made with Government support under FA8750-18-C-0015 awarded by U.S. Air Force, Office of Scientific Research. The government has certain rights to this invention.

BACKGROUND

Embodiments of the present disclosure relate to neural inference chips, and more specifically, to a compound instruction set architecture therefor.

BRIEF SUMMARY

According to embodiments of the present disclosure, a device for controlling neural inference processor cores is provided. The device comprises an instruction memory, which comprises a plurality of instructions for controlling a neural inference processor core. Each of the plurality of instructions comprises a control operation. The device further comprises a program counter. The device further comprises at least one loop counter register. The device is adapted to execute the plurality of instructions. Executing the plurality of instructions comprises: reading an instruction from the instruction memory based on a value of the program counter; updating the at least one loop counter register according to the control operation of the instruction; and updating the program counter according to the control operation of the instruction and a value of the at least one loop counter register.

According to embodiments of the present disclosure, methods of and computer program products for operating a neural inference chip are provided. A plurality of instructions is read from an instruction memory of a neural inference chip. Each of the plurality of instructions comprises a control operation and an address operation. The plurality of instructions is executed by: updating at least one loop counter register according to the control operation of each instruction; updating a program counter according to the control operation of the instruction and a value of the at least one loop counter register; updating a program counter over the plurality of instructions; updating at least one loop counter register according to the control operations; and updating at least one address register according to the address operations of the instruction.

BRIEF DESCRIPTION OF THE SEVERAL VIEWS OF THE DRAWINGS

FIG. 5 illustrates an exemplary execution trace for a loop according to embodiments of the present disclosure.

FIG. 6 illustrates an exemplary execution trace for loop addressing according to embodiments of the present disclosure.

DETAILED DESCRIPTION

Figure 1:
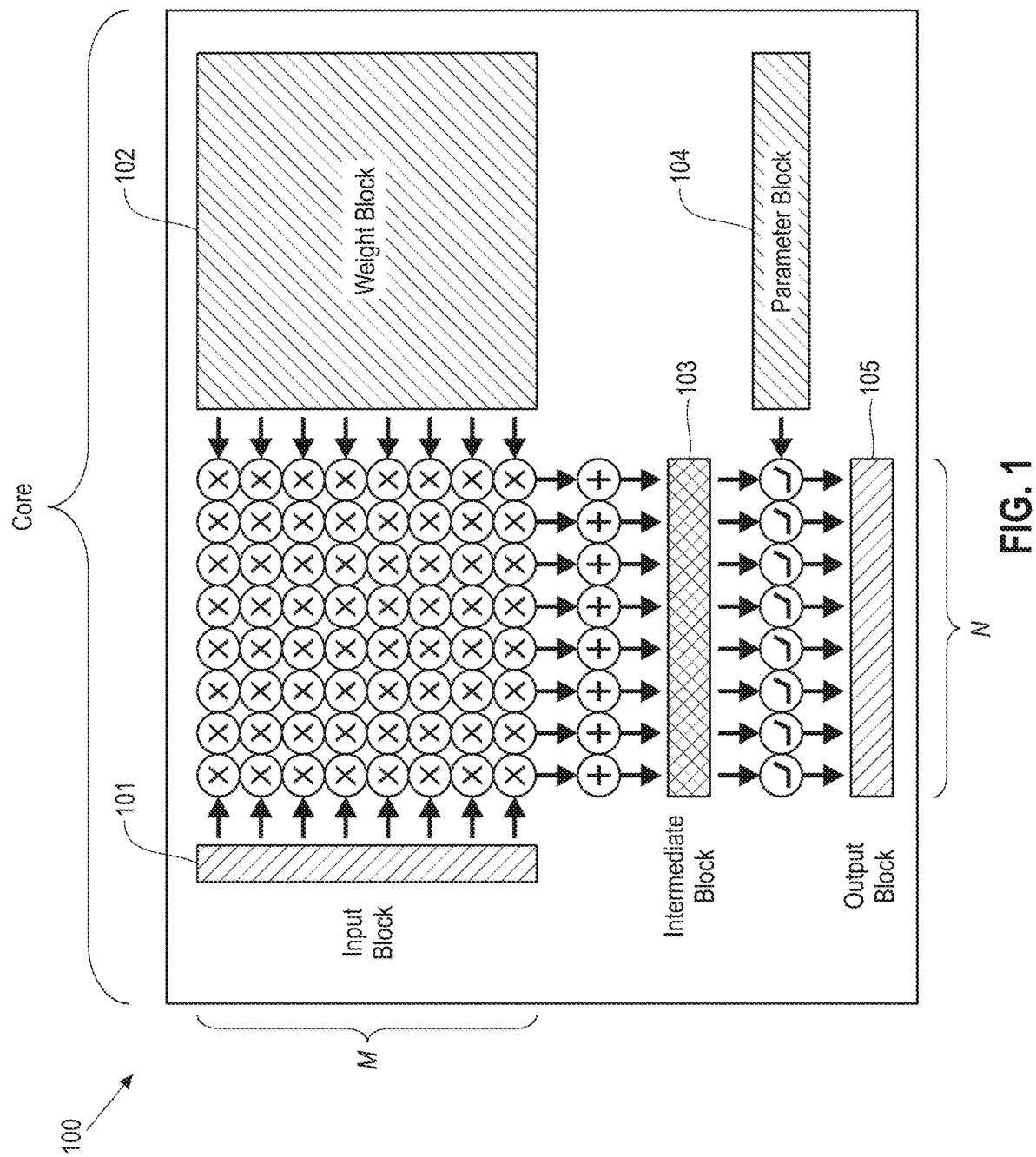
FIG. 1 illustrates a neural core according to embodiments of the present disclosure.

An artificial neuron is a mathematical function whose output is a nonlinear function of a linear combination of its inputs. Two neurons are connected if the output of one is an input to the other. A weight is a scalar value encoding the strength of the connection between the output of one neuron and the input of another neuron.

A neuron computes its output, called an activation, by applying a nonlinear activation function to a weighted sum of its inputs. A weighted sum is an intermediate result computed by multiplying each input with the corresponding weight and accumulating the products. A partial sum is a weighted sum of a subset of inputs. A weighted sum of all inputs may be computed in stages by accumulating one or more partial sums.

A neural network is a collection of one or more neurons. A neural network is often divided into groups of neurons called layers. A layer is a collection of one or more neurons that all receive input from the same layers and all send output to the same layers, and typically perform a similar function. An input layer is a layer that receives input from a source outside the neural network. An output layer is a layer that sends output to a target outside the neural network. All other layers are intermediate processing layers. A multilayer neural network is a neural network with more than one layer. A deep neural network is a multilayer neural network with many layers.

A tensor is a multidimensional array of numerical values. A tensor block is a contiguous subarray of the elements in a tensor.

Each neural network layer is associated with a parameter tensor V, weight tensor W, input data tensor X, output data tensor Y, and intermediate data tensor Z. The parameter tensor contains all of the parameters that control neuron activation functions a in the layer. The weight tensor contains all of the weights that connect inputs to the layer. The input data tensor contains all of the data that the layer consumes as input. The output data tensor contains all of the data that the layer computes as output. The intermediate data tensor contains any data that the layer produces as intermediate computations, such as partial sums.

The data tensors (input, output, and intermediate) for a layer may be 3-dimensional, where the first two dimensions may be interpreted as encoding spatial location and the third dimension as encoding different features. For example, when a data tensor represents a color image, the first two dimensions encode vertical and horizontal coordinates within the image, and the third dimension encodes the color at each location. Every element of the input data tensor X can be connected to every neuron by a separate weight, so the weight tensor W generally has 6 dimensions, concatenating the 3 dimensions of the input data tensor (input row a, input column b, input feature c) with the 3 dimensions of the output data tensor (output row i, output column j, output feature k). The intermediate data tensor Z has the same shape as the output data tensor Y. The parameter tensor V concatenates the 3 output data tensor dimensions with an additional dimension o that indexes the parameters of the activation function $\sigma$.

An element of a layer's output data tensor Y can be computed as in Equation 1 where the neuron activation function σ is configured by the vector of activation function parameters V[i,j,k,:], and the weighted sum Z[i,j,k] can be computed as in Equation 2.

$$Y[i, j, k] = \sigma(V[i, j, k, :]; Z[i, j, k]) \quad \text{Equation 1}$$

$$Z[i, j, k] = \sum_{a=1}^{A} \sum_{b=1}^{B} \sum_{c=1}^{C} W[i, j, k, a, b, c] \cdot X[a, b, c] \quad \text{Equation 2}$$

For simplicity of notation, the weighted sum in Equation 2 may be referred to as the output, which is equivalent to using a linear activation function Y[i,j,k]=σ(Z[i,j,k])=Z[i,j,k], with the understanding that the same statements apply without loss of generality when a different activation function is used.

In various embodiments, computation of the output data tensor as described above is decomposed into smaller problems. Each problem may then be solved on one or more neural core, or on one or more core of a conventional multicore system in parallel.

It will be appreciated from the above that neural inference processing is parallelizable. In particular, a Neural Inference Processor core exploits algorithmic parallelism in a variety of ways. Vector/Matrix parallelism allows multiple parallel arithmetic units to perform the same operation (on a vector or matrix). Pipeline parallelism allows multiple arithmetic functions to be pipelined, including vector-matrix multiplication, vector arithmetic, and activation function. Data path parallelism allows parallel partial sum computations and communication operations. The core interconnect has multiple arithmetic and communication paths for performing multiple partial sum computation and/or communication operations in parallel.

The present disclosure describes a processing system that exploits the pipeline parallelism and data path parallelism in a single neural processing core by means of multi-agent computation.

A neural inference computation takes place on one or more cores of computation. Each core is capable of executing multiple computational components of the inference computation concurrently. These may be multiple parts of a sequence of independent instructions comprising a single computation. For example, partial sums may be computed based on a weight and input activation, executing in parallel with a partial sum accumulation relating to a different receptive field. They may be independent computations, running in parallel, e.g., the accumulation of two sets of partial sums, relating to different input fields. They may be overlapped computations, e.g., the last operations of one inference frame, plus the first operations of another inference pass.

Operation of a Neural Inference Processor core is controlled by a core microengine. The operations performed by the neural inference core include arithmetic and logical computation, communication, and memory addressing operations. The core microengine may be composed of one or more agents. Multiple agents enable parallel control of the parallel datapaths and parallel functional units within the neural core. Additional discussion of agents in this context is provided in commonly invented and assigned U.S. Ser. No. 16/161,867, filed on Oct. 16, 2018, which is hereby incorporated by reference in its entirety.

In various embodiments, a compound instruction set architecture (ISA) is provided for operating a microengine to execute the distributed computation of a neural inference processing chip unit. Such architectures orchestrate all of the computational operations required to perform inference processing. In various embodiments, they allow execution of all operations in a single pipelined cycle. In various embodiments, they enable each instruction to be executed once or many times, specified by the loop counter value indexed by each instruction. In various embodiments, they enable each instruction to update the program counter with a relative offset specified by the instruction and depending on the state of the loop counter value. In various embodiments, a set of address registers specified by each instruction at each cycle of operation are used and updated. In various embodiments, data instructions are generated for controlling computation operation.

With reference now to FIG. 1, a neural core according to embodiments of the present disclosure is depicted. A neural core 100 is a tileable computational unit that computes one block of an output tensor. A neural core 100 has M inputs and N outputs. In various embodiments, M=N. To compute an output tensor block, a neural core multiplies an M×1 input tensor block 101 with an M×N weight tensor block 102 and accumulates the products into weighted sums that are stored in a 1×N intermediate tensor block 103. A O×N parameter tensor block contains the O parameters that specify each of the N neuron activation functions that are applied to the intermediate tensor block 103 to produce a 1×N output tensor block 105.

Multiple neural cores may be tiled in a neural core array. In some embodiments, the array is 2-dimensional.

A neural network model is a set of constants that collectively specify the entire computation performed by a neural network, including the graph of connections between neurons as well as the weights and activation function parameters for every neuron. Training is the process of modifying the neural network model to perform a desired function. Inference is the process of applying a neural network to an input to produce an output, without modifying the neural network model.

An inference processing unit is a category of processors that perform neural network inference. A neural inference chip is a specific physical instance of an inference processing unit.

Figure 2:
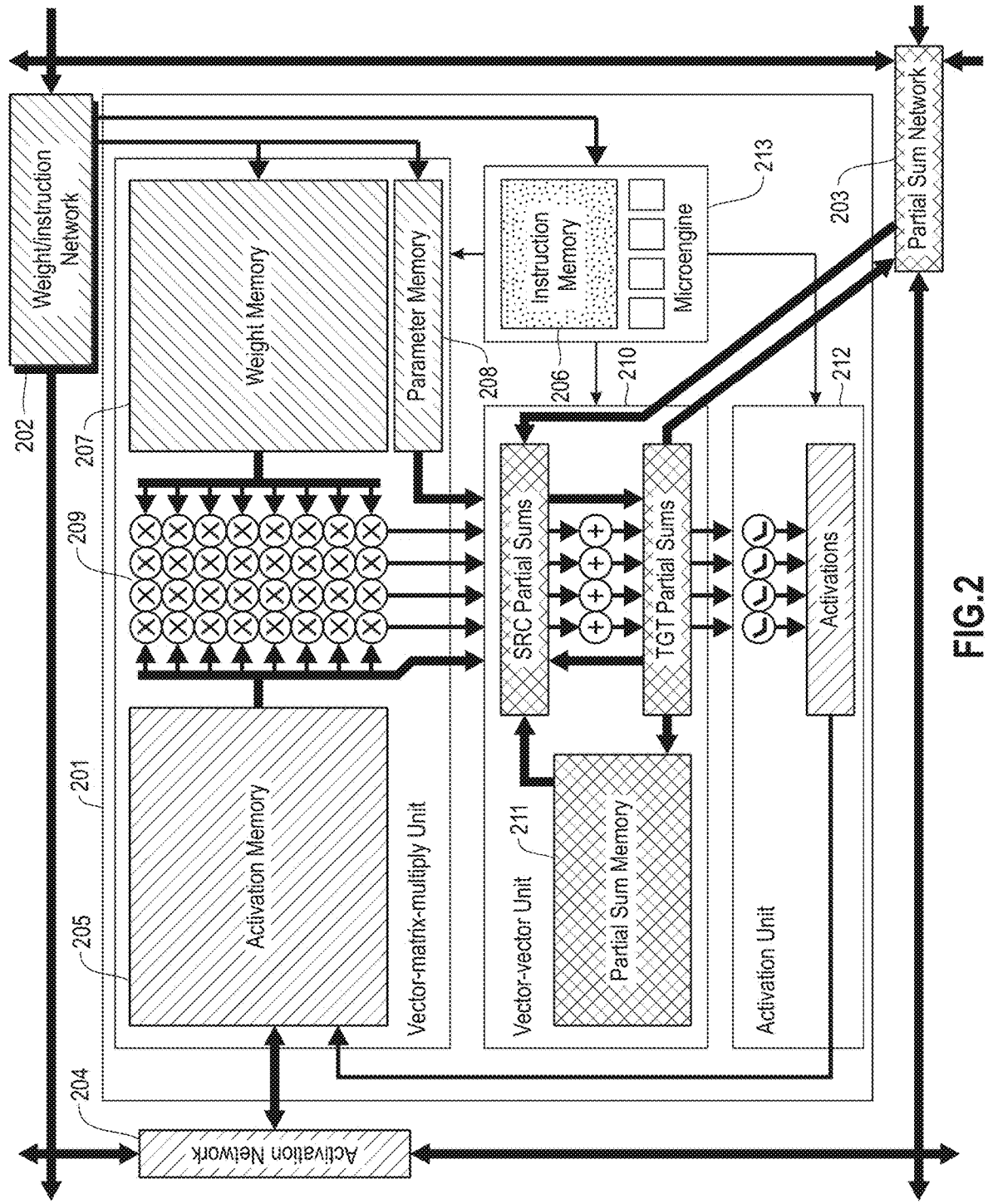
FIG. 2 illustrates a neural core and associated networks according to embodiments of the present disclosure.

With reference now to FIG. 2, an exemplary neural core and associated networks are illustrated according to embodiments of the present disclosure. Core 201, which may be embodied as described with reference to FIG. 1 is interconnected with additional cores by networks 202 . . . 204. In this embodiments, network 202 is responsible for distributing weights and/or instructions, network 203 is responsible for distributing partial sums, and network 204 is responsible for distributing activations. However, it will be appreciated that the various embodiments of the present disclosure may combine these networks, or further separate them into multiple additional networks.

Referring to FIG. 2, input activations (X) are distributed to core 201 from off-core via activation network 204 to activation memory 205. Layer instructions are distributed to core 201 from off-core via weight/instruction network 202 to instruction memory 206. Layer weights (W) and/or parameters are distributed to core 201 from off-core via weight/instruction network 202 to weight memory 207 and/or parameter memory 208.

The weight matrix (W) is read from weight memory 207 by Vector Matrix Multiply (VMM) unit 209. The activation vector (V) is read from activation memory 205 by Vector Matrix Multiply (VMM) unit 209. Vector Matrix Multiply (VMM) unit 209 then computes vector-matrix multiplication $Z=X^T W$ and provides the result to Vector-Vector unit 210. Vector-Vector unit 210 reads additional partial sums from partial sum memory 211, and receives additional partial sums from off-core via partial sum network 203. A vector-vector operation is computed by Vector-Vector unit 210 from these source partial sums. For example, the various partial sums may in turn be summed. The resulting target partial sums are written to partial sum memory 211, sent off-core via partial sum network 203, and/or fed back for further processing by Vector-Vector unit 210.

The partial sum results from Vector-Vector unit 210, after all computation for a given layer's inputs is complete, are provided to activation unit 212 for the computation of output activations. The activation vector (Y) is written to activation memory 205. Layer activations (including the results written to activation memory) are redistributed across cores from activation memory 205 via activation network 204. Upon receipt, they are written to local activation memory to each receiving core. Upon completion of processing for a given frame, the output activations are read from activation memory 205 and sent off-core via network 204.

Accordingly, in operation, a core control microengine (e.g., 213) orchestrates the data movement and computation of the core. The microengine issues a read activation memory address operation to load an input activation block into the vector-matrix multiply unit. The microengine issues a read weight memory address operation to load a weight block into the vector-matrix multiply unit. The microengine issues the vector-matrix multiply unit a compute operation, such that vector-matrix multiply unit compute array computes a partial sum block.

The microengine issues one or more of a partial sum read/write memory address operation, vector compute operation, or partial sum communication operation in order to do one or more of the following: read partial sum data from partial sum sources; compute using partial sums arithmetic units; or write partial sum data to partial sum targets. Writing partial sum data to partial sum targets may include communicating external to the core via the partial sum network interface or sending partial sum data to the activation arithmetic unit.

The microengine issues an activation function compute operation, such that the activation function arithmetic unit computes an output activation block. The microengine issues a write activation memory address and the output activation block is written to the activation memory via the activation memory interface.

Accordingly, a variety of sources, targets, address types, computation types, and control components are defined for a given core.

Sources for vector-vector unit 210 include Vector Matrix Multiply (VMM) unit 209, activation memory 205, constants from parameter memory 208, partial sum memory 211, partial sum results from prior cycles (TGT partial sums); and partial sum network 203.

Targets for vector-vector unit 210 include partial sum memory 211, partial sum results for subsequent cycles (SRC partial sums), activation unit 212, and partial sum network 203.

Accordingly, a given instruction may read or write from activation memory 205, read from weight memory 207, or read or write from partial sum memory 211. Compute operations performed by the core include vector matrix multiplication by VMM unit 209, vector (partial sum) operations by vector unit 210, and activation functions by activation unit 212.

Control operations include program counters and loop and/or sequence counters.

Thus, memory operations are issued to read weights from addresses in weight memory, read parameters from addresses in parameter memory, read activations from addresses in activation memory, and read/write partial sums to addresses in partial sum memory. Computation operations are issued to perform vector-matrix multiplication, vector-vector operations, and activation functions. Communication operations are issued to select the vector-vector operands, route messages on the partial sum network, and select partial sum targets. Loops over layer outputs and loops over layer inputs are controlled by control operations specifying program counters, loop counters, and sequence counters.

Figure 3:
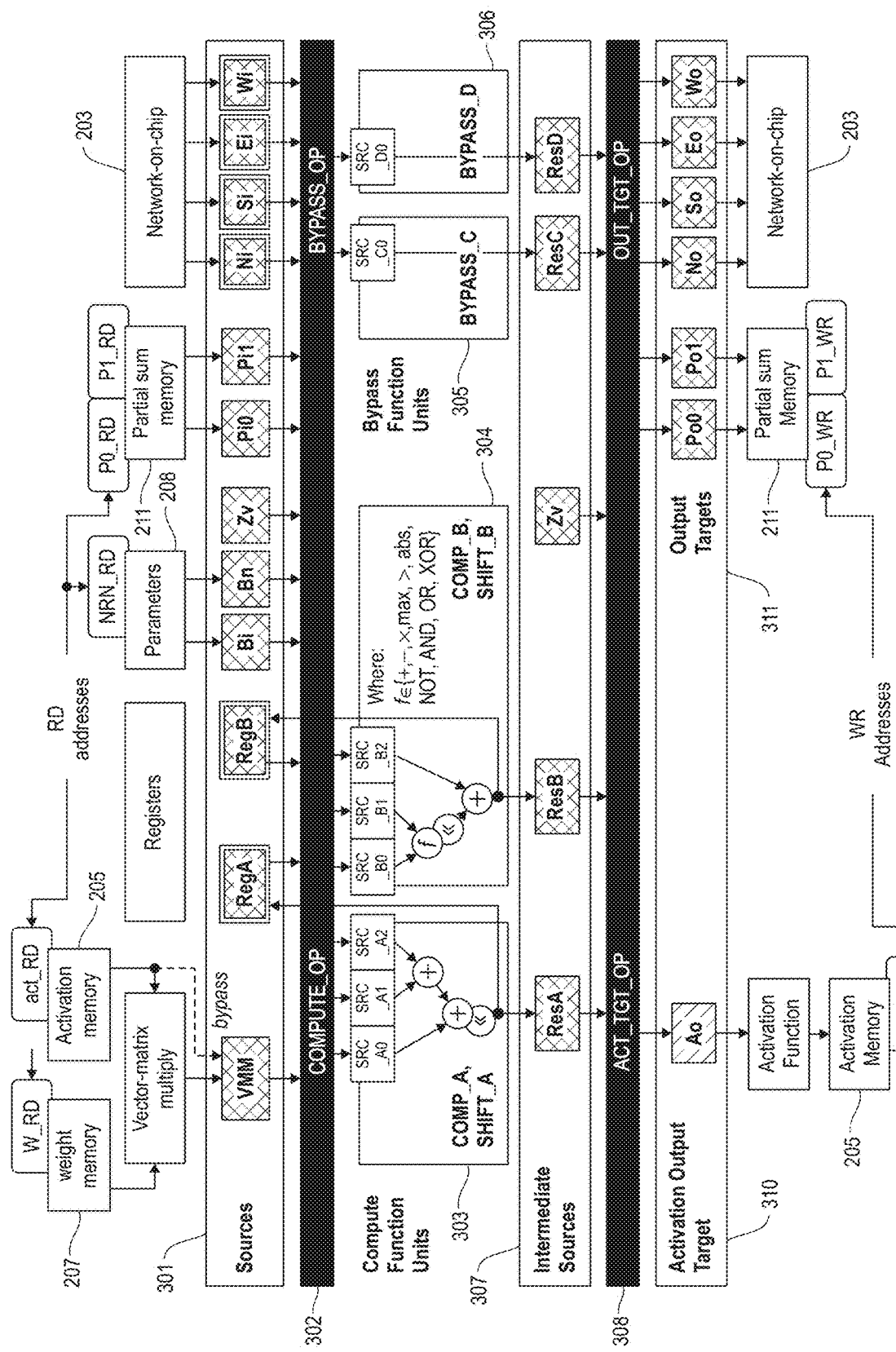
FIG. 3 is a detail view of a vector unit according to embodiments of the present disclosure.

Referring to FIG. 3, a detail view of a vector unit slice according to embodiments of the present disclosure is provided. A vector unit has many vector unit slices, to operate on all the elements of a vector in parallel, so just a slice is depicted here. In some embodiments, all slices of the vector unit perform the same operations at the same time on their respective vector elements in parallel. Sources 301 correspond to the sources described above. In particular, weight memory 207 is accessed at read address W_RD and activation memory 205 is accessed at read address act_RD to provide input to vector-matrix multiplication, the result of which in turn serves as a source to the vector-vector unit. Parameter memory 208 is accessed at read address NRN_RD to provide parameters to the vector-vector unit. Partial sum memory 211 is accessed at read address P0_RD and P1_RD to retrieve partial sum operands for the vector-vector unit. The network on chip 203 is used to provide partial sum inputs to the vector-vector unit. As pictured, inputs are received from four cardinal directions, north, south, east, and west. However, it will be appreciated that a variety of network configurations may be used according to the present disclosure to allow receipt of inputs from arbitrary cores.

Operations 302 include Compute OPs (COMPUTE_OP) and Bypass OPs (BYPASS_OP). Compute OPs Map sources 301 to the compute function units 303, 304 (A and B) and specify computation to be performed by the compute function units. Bypass OPs (BYPASS_OP) Map sources 301 to bypass function units 305, 306 (C and D). The results of computation or bypass make up intermediate sources 307.

Operations 308 on intermediate sources 307 include Output Target OPs (OUT_TGT_OP) and Activation Output Target OP (ACT_TGT_OP). Output Target Ops Map intermediate sources 307 to output targets 309. Activation Output Target OPs Map intermediate sources 307 to activation output target 310 and specify computation to be performed by the activation function unit.

The results of the activation function are written to activation memory 205 at write address ACT_WR. Partial sums are written to partial sum memory 311 at write addresses P0_WR and P1_WR. Network outputs are sent via network 203. As pictured, outputs are sent to four cardinal directions, north, south, east, and west. However, it will be appreciated that a variety of network configurations may be used according to the present disclosure to allow sending output to arbitrary cores.

It will be appreciated that a given core may include a plurality of function units. Accordingly, FIG. 3 depicts one slice of a vector-vector unit for simplicity of description.

Figure 4:
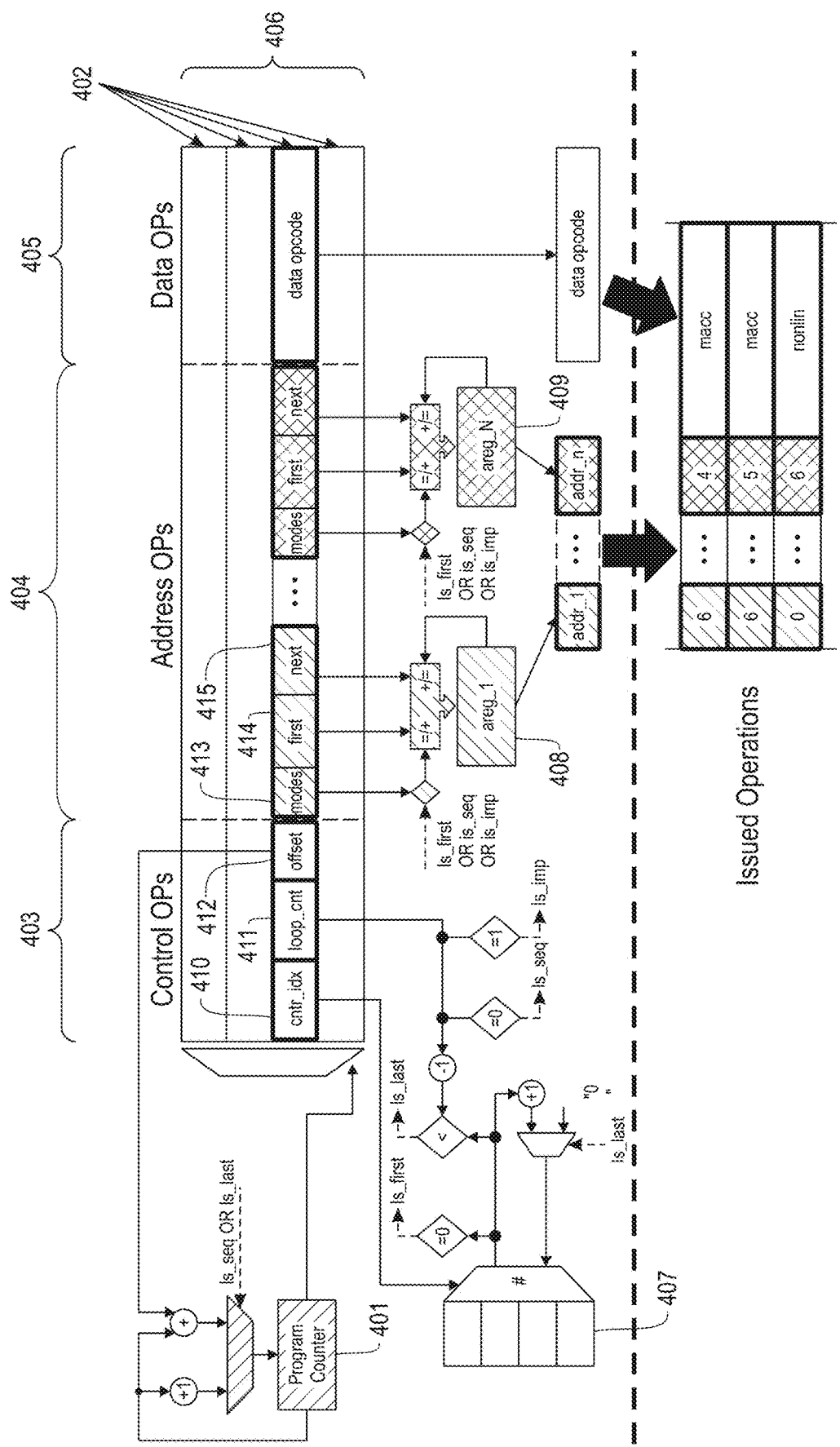
FIG. 4 is a schematic view of an Instruction Set Architecture according to embodiments of the present disclosure.

Referring to FIG. 4, a schematic view of an Instruction Set Architecture according to embodiments of the present disclosure is provided.

The compound Instruction Set Architecture is split into three parts: a control OP, an address OP, and a data OP. A full instruction is composed of the concatenation of these three instruction subsets: control OP+address OP+data OP.

A control OP is a subset of the instruction for efficient program control. Each control OP operates on a program-counter and a set of loop counter registers, to determine the next instruction to execute. Each instruction generates one or more data OPs per cycle. Each instruction generates one or more address OPs per cycle.

An address OP is a subset of the instruction for efficiently generating addresses. Each address OP operates on a set of address registers. Each address OP contains for some or all address registers: an initial value, an update value, and an update mode identifier.

A data OP is a subset of the instruction for controlling neural inference operations. Each data OP has an opcode and all operands as values. Each data OP is executed once per instruction issue. Example data OPs include: arithmetic, logical, formatting, and communication operations.

Program-counter 401 is used to address instructions 402 within a microengine (e.g., 213) in a sequence. As noted above, instructions 402 each comprise a control OP 403, an address OP 404, and a data OP 405. Taken together a plurality of instructions 402 make up a program 406.

Loop counter registers 407 are used for tracking nested loops in control patterns/sequences. Each counter register corresponds to a single loop counter.

Address registers 408 . . . 409 are used for generating address fields in the data operation instructions, including the read and write addressing of parameter memory and activation data memory. Address registers 408 . . . 409 are also used for generating partial sum block addresses, and/or routing information. As set out below, register contents may be set/increment by a mode parameter on execution of an instruction.

Upon issue, data opcodes 405 are sent directly from instruction to execution unit(s).

A tensor convolution may be defined as in Equation 3.

$$O[k, p, q] = \underbrace{\sum_{r=-\frac{R-1}{2}}^{\frac{R-1}{2}} \sum_{s=-\frac{S-1}{2}}^{\frac{S-1}{2}} \sum_{i=0}^{\lceil C/N \rceil - 1} \sum_{j=0}^{N-1} F[k, i \cdot N + j, r, s] \cdot D[i \cdot N + j, p \cdot u + r, q \cdot v + s]}_{=P(k,p,q,r,s,i)}$$

Equation 3

The number of steps necessary for execution of a tensor convolution may then be given as in Equation 4, where $$\left\lceil \frac{H}{A} \right\rceil \times \left\lceil \frac{W}{B} \right\rceil$$

corresponds to the number of pixels per core, R×S corresponds to the number of filter elements, [C/N] corresponds to the number of input feature groups, and [K/M] corresponds to the number of output feature groups.

$$\left\lceil \frac{H}{A} \right\rceil \times \left\lceil \frac{W}{B} \right\rceil \times R \times S \times \lceil C/N \rceil \times \lceil K/M \rceil$$

Equation 4

Each quantity corresponds to a summation to one or more for loops. As shown above, the for loops are nested, for computing the full tensor convolution.

The ISA as described herein allows efficient representation of these summation loops. In particular, the ISA is semantically efficient, allowing compact specification, and runtime efficient, using the fewest possible number of instructions to distribute or fetch, thereby ensuring computation is not unnecessarily held up.

In various embodiments, an instruction includes control OPs, which in turn include cntr_idx 410, loop_control 411, and offset 412 fields. The counter index field (cntr_idx) provides an index of the loop counter register to reference for a given instruction. The loop control field indicates the number of loops to execute for a given loop counter register. The offset field provides the program counter relative offset to jump to for each execution of the instruction within a given loop (when the loop counter register at cntr_idx is less than the number of loops to execute). In various embodiments, the program counter is absolute instead of relative. The opcode fields specify the function(s) to execute each time the instruction is issued, such as address or data operations 404, 405. This may contain many sub-fields.

Loop control according to various embodiments is provided according to the pseudocode in Inset 1. A summary of the loop control fields is provided in Table 1.

Inset 1

```
// Execute instruction:
cmd[PC]
// Update program counter (PC):
if (loop_ctrl == 0) {
    // Sequential case
    PC = PC + 1
} else if (loop_ctrl == 1) {
    // Jump case
    PC = PC + offset
} else {
    // Loop case
    if (cntr[cntr_idx] < loop_ctrl -1) {
        PC = PC + offset
    } else {
        PC = PC + 1
        cntr[cntr_idx] = 0
    }
}
```

TABLE 1

| Field | Bits | Description |
|---|---|---|
| cntr_idx | 4 | index of loop counter to check and increment. |
| loop_ctrl | 8 | loop control behavior: {sequential. jump, loop_count cycles (256 max)}. |
| offset | 8 | program counter relative offset to jump to each time loop is executed. |

Referring to FIG. 5, an exemplary execution trace is provided for a loop according to embodiments of the present disclosure. In this example, the output data tensor is defined by Equation 5, where F is a filter, D is the input data tensor, f is an activation function, and O is an output data tensor.

$$O(l) = f\left(\sum_i F(i, l) D(i)\right)$$

This computation may be phrased as the for loop of Inset 2.

Inset 2

```
for     (1 = 1:num_output_feature_groups) {
        P = 0;
        for     (i = 1:num_input_feature_groups) {
                P += F(i,l) D(i)
        }
        O(l) = f(P)
}
```

The instructions that compose a compact program to perform these calculations may then be given as in Inset 3, which may be provided to a system as describe herein (e.g., referring to instructions 406). In the example program in Inset 3, the value of the variable num_input_feature_groups in Inset 2 is set to 4, and the value of the variable num_output_feature_groups in Inset 2 is set to 2. The resulting execution trace, including the content of the program counter (e.g., 401) and the corresponding loop counter registers (e.g., 407) is shown in FIG. 5.

Inset 3

| | cntr_idx | loop_ctrl | offset | opcode |
|---|---|---|---|---|
| I0: | 0 | 0 | 0 | [set P=0] |
| I1: | 1 | 4 | 0 | [P = MAC(F,D)] |
| I2: | 2 | 2 | -2 | [O = f(P)] |
| END | | | | |

Referring back to Equation 3, the input tensor D, output tensor O, partial sum tensor, and filter tensors F are all stored in memory. They need to be addressed to be read out of memory for computation, and written back into memory after computation. Accordingly, the present disclosure provides for efficient addressing of data within the summation loops.

In various embodiments, an instruction includes address OPs, which in turn include addr_mode 413, first_offset 414, and next_offset 415 fields for the specified address register. The address mode determined the operation to perform on the address register each time the instruction is executed. For example, FIRST_MODE may assign or increment the address on the first loop iteration, while NEXT_MODE may assign or increment the address on subsequent loop iterations. First Offset defines the value to assign/increment the address to/by, on first loop iteration. Next Offset defines the value to assign/increment address to/by, on subsequent loop iterations.

Address control according to various embodiments is provided according to the pseudocode in Inset 4. A summary of the loop control fields is provided in Table 2.

Inset 4

```
// JUMP, SEQUENTIAL, and LOOP Entrance cases are all considered
first time
if ( loop_ctrl <= 1 ) || ( cntr[cntr_idx] == 0 ) {
  //FIRST increment/assign
  if (first_mode == INCR)
    addr += first_offset
  else
    addr = first_offset
} else {
  // NEXT increment
  if (next_mode == INCR)
    addr += next_offset
  else
```

Inset 4

```
    addr = next_offset
}
// Execute instruction:
cmd(addr)
```

TABLE 2

| Field | Bits | Value | Description |
|---|---|---|---|
| first_mode | 1 | — | FIRST increment mode {INCR, ASSIGN} |
| | | 0 | INCR: add (signed) first_offset to address register |
| | | 1 | ASSIGN: assign first_offset to address register |
| next_mode | 1 | — | NEXT increment mode [INCR, ASSIGN] |
| | | 0 | INCR: add (signed) next_offset to address register |
| | | 1 | ASSIGN: assign next_offset to address register |
| first_offset | 12 | — | offset to add/subtract to/from address first time through loop |
| next_offset | 7 | — | offset to add/subtract to/from address subsequent times through loop |

Referring to FIG. 6, an exemplary execution trace is provided for loop addressing according to embodiments of the present disclosure. As above, in this example, the output data tensor is defined by Equation 5, where F is a filter, D is the input data tensor, f is an activation function, and O is an output data tensor. This computation may be phrased as the for loop of Inset 2.

The instructions that compose a compact program to perform the necessary address control may then be given as in Inset 5, assuming two output feature groups and four input feature groups, which may be provided to a system as described herein (e.g., referring to instructions 406). The resulting execution trace, including the addresses at each step for input tensor D and filter tensors F is shown in FIG. 6.

Inset 5

| | cntr_idx | loop_ctrl | offset | opcode | F_Addr | D_Addr |
|---|---|---|---|---|---|---|
| I0: | 0 | 8 | +1 | [set P=0] | (0,+0) | (32,20) |
| I1: | 1 | 4 | 0 | [P=MAC(F,D)] | (+8,+1) | (100,+16) |
| I2: | 2 | 2 | -2 | [O=f(P)] | (+5,75) | (nop) |
| END | | | | | | |

In this example, the comma-delimited elements of each address operation (F_Addr and D_Addr) corresponds to the first and next subfields (e.g., 414, 415). A plus sign indicates an increment, while the lack of a plus sign indicates an assignment.

In various embodiments, data OPs (e.g., 405) are given in the form {OP_CODE, OPERAND$_0$, . . . OPERAND$_N$}, where the OP_CODE selects the function to execute, and the operands determine source and target. Example of data OPs are provided in Table 3.

TABLE 3

| Arithmetic | add, sub, mult, max, abs |
|---|---|
| Logical | INV, NOT, AND, OR, XOR |
| Conditional | COND_CMPR (compare, assign A, else, assign B) |
| Formatting | assign, SHIFT |

TABLE 3-continued

| | |
|---|---|
| Complex Arithmetic Functions | VMM (Vector Matrix Multiply), neural activation function |
| Communication | Move, Tx (transmit), load/read from, store/write to |

As set out above, a compound instruction set architecture is provided to run in each microengine to execute the distributed computation of a neural inference processing chip unit. In various embodiments, each instruction simultaneously updates the program counter, all address registers, and an associated loop counter register. In various embodiments, the loop count is used to determine the update to the address register(s). In various embodiments, each instruction generates one or more data operations, which are issued in parallel and executed in order by the data instruction set units. In various embodiments, the instructions specify: the read data address(es), the computation(s) to be performed, the result communication destination, and the write data address(es). In various embodiments, the control, address, and data instruction set units operate from the same clock (synchronous). In various embodiments, the control, address, and data instruction set units operate from independent clock (asynchronous), with the instruction unit running at a higher or lower speed.

Figure 7:
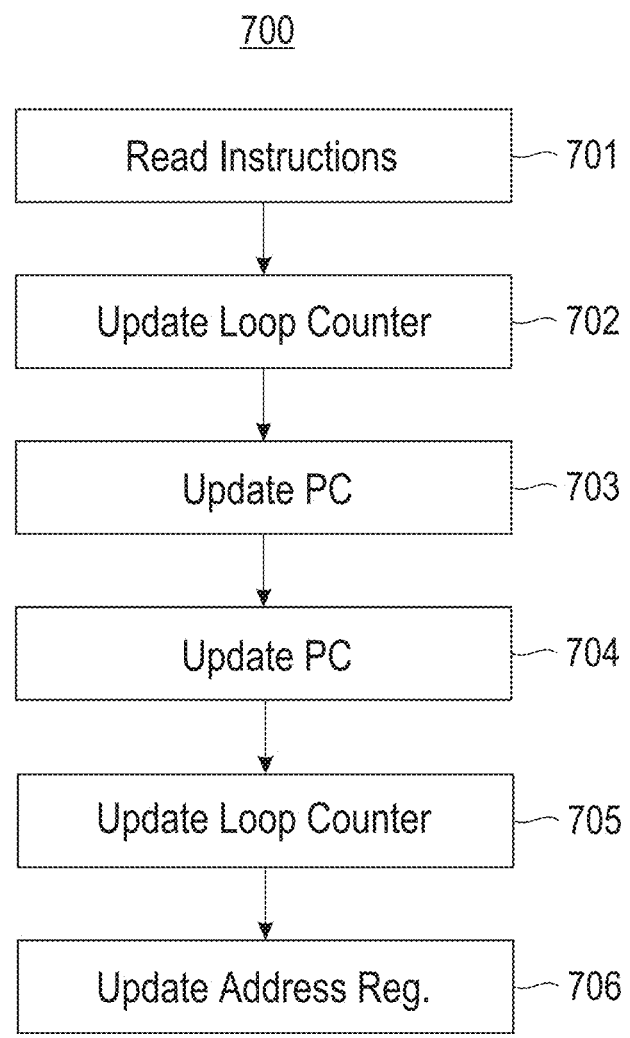
FIG. 7 illustrates a method for operating a neural inference chip according to embodiments of the present disclosure.

Referring now to FIG. 7, a method of operating a neural inference chip is illustrated according to embodiments of the present disclosure. At 701, a plurality of instructions is read from an instruction memory of a neural inference chip. Each of the plurality of instructions comprises a control operation and an address operation. The plurality of instructions is executed by: at 702, updating at least one loop counter register according to the control operation of each instruction; at 703, updating a program counter according to the control operation of the instruction and a value of the at least one loop counter register; at 704, updating a program counter over the plurality of instructions; at 705, updating at least one loop counter register according to the control operations; and, at 706, updating at least one address register according to the address operations of the instruction.

Figure 8:
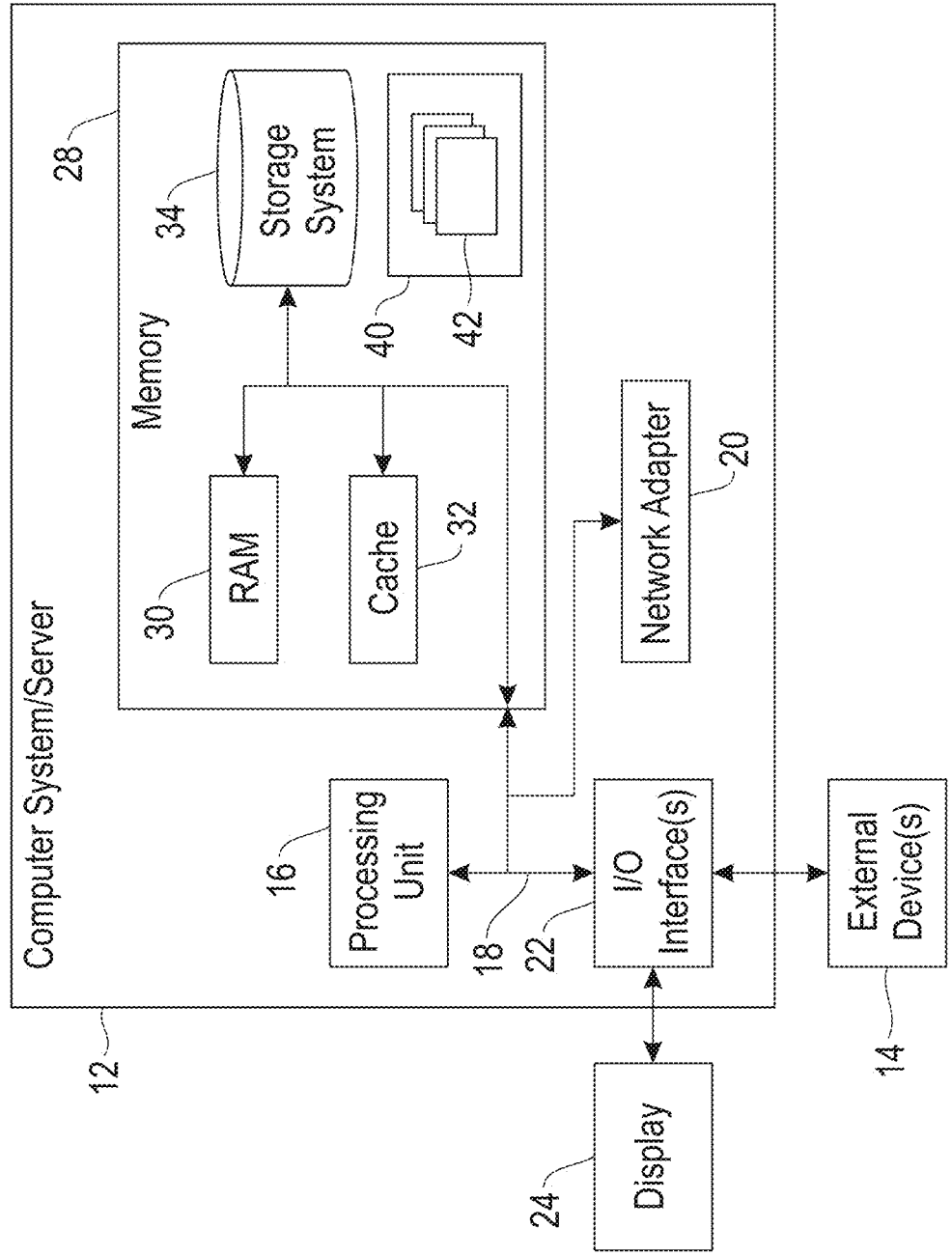
FIG. 8 depicts a computing node according to an embodiment of the present disclosure.

Referring now to FIG. 8, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device comprising:
    an instruction memory, the instruction memory comprising a plurality of instructions for controlling a neural inference processor core, each of the plurality of instructions comprising a control OP, an address OP, and a data OP;
    a program counter; and
    at least one loop counter register,
    wherein
    the device is adapted to execute the plurality of instructions, wherein executing the plurality of instructions comprises:
        reading an instruction from the instruction memory based on a value of the program counter;
        updating the at least one loop counter register according to the control OP of the instruction, thereby tracking at least one loop defined by the control OP; and
        updating the program counter according to the control OP of the instruction and a value of the at least one loop counter register, wherein
    a next instruction to execute is determined by operation of the control OP on the program counter and the at least one loop counter register.

2. The device of claim 1, wherein the plurality of instructions correspond to a portion of a distributed neural network computation.

3. The device of claim 1, further comprising:
    at least one address register, wherein
        executing the plurality of instructions further comprises updating the at least one address register according to the address OP of the instruction,
        wherein the address OP specifies an operation to perform on the address register upon such execution.

4. The device of claim 3, wherein updating the at least one address register is based on at least one loop counter register.

5. The device of claim 4, wherein the address OP specifies offsets to update the at least one address register on the first and subsequent iterations of the at least one loop counter register.

6. The device of claim 5, wherein the address OP specifies an increment or assignment update to the at least one address register.

7. The device of claim 3, wherein the program counter, the at least one loop counter register, and the at least one address register are updated substantially simultaneously for each of the plurality of instructions.

8. The device of claim 1, wherein the data OP directs a computation or communication operation in the neural inference processor core.

9. The device of claim 1, wherein the data OP comprises a computation opcode, one or more source operands, and one or more target operands.

10. The device of claim 1, wherein the loop counter tracks the number of iterations that an offset is applied to the program counter.

11. The device of claim 1, wherein the control operation specifies sequential, jump, or loop operations to update the program counter.

12. The device of claim 1, wherein executing the plurality of instructions comprises generating one or more address or data OPs for each control OP and executing said one or more address or data OPs in order.

13. The device of claim 12, wherein generating the one or more address or data OPs comprises unrolling a for loop.

14. The device of claim 12, wherein the one or more address or data OPs comprise a read data address, a computation, a result destination address, and a write data address.

15. The device of claim 3, wherein the program counter, the at least one loop counter register, and the at least one address register are updated synchronously according to a common clock.

16. The device of claim 3, wherein the program counter, the at least one loop counter register, and the at least one address register are updated asynchronously.

17. The device of claim 16, wherein the program counter and loop counter register are updated at a higher clock speed than the updating of the at least one address register.

18. The device of claim 1, wherein each of the plurality of instructions comprises an index of the loop counter register, a loop control field indicating a number of loops to execute for the loop counter register, and an offset field determining a program counter offset.

19. The device of claim 5, wherein the offsets include a first offset that specifies to assign or increment the address register on the first iteration and a next offset that specifies to assign or increment the address register on subsequent iterations.

20. A method comprising:
    reading a plurality of instructions from an instruction memory of a neural inference chip, each of the plurality of instructions comprising a control OP, a data OP, and an address OP; and
    executing the plurality of instructions by:
        updating at least one loop counter register according to the control OP of each instruction, thereby tracking at least one loop defined by the control OP;
        updating a program counter according to the control OP of the instruction and a value of the at least one loop counter register; and
        updating at least one address register according to the address OP of the instruction, wherein
    a next instruction to execute is determined by operation of the control OP on the program counter and the at least one loop counter register.

* * * * *